United States Patent [19]
Lewis et al.

[11] Patent Number: 6,020,533
[45] Date of Patent: *Feb. 1, 2000

[54] HYDROCARBON CONVERSION PROCESSES USING CRYSTALLINE MANGANESE PHOSPHATE COMPOSITIONS

[75] Inventors: Gregory J. Lewis; Paula L. Bogdan, both of Mt. Prospect, Ill.

[73] Assignee: UOP LLC, Des Plaines, Ill.

[ * ] Notice: This patent is subject to a terminal disclaimer.

[21] Appl. No.: 09/112,992

[22] Filed: Jul. 10, 1998

Related U.S. Application Data

[63] Continuation-in-part of application No. 08/707,986, Aug. 23, 1996, Pat. No. 5,780,003.
[51] Int. Cl.[7] .............................. C07C 5/333; C07C 6/08; C07C 253/00; C07C 45/00; C07D 307/89
[52] U.S. Cl. .................. 585/443; 549/248; 549/258; 558/320; 558/321; 558/325; 568/402; 585/654; 585/708
[58] Field of Search ....................... 585/654, 443, 585/708; 549/248, 258; 558/320, 321, 325; 568/402

[56] References Cited

U.S. PATENT DOCUMENTS

| | | | |
|---|---|---|---|
| 4,310,440 | 1/1982 | Wilson et al. | 423/305 |
| 4,567,029 | 1/1986 | Wilson et al. | 423/306 |
| 4,793,833 | 12/1988 | Lok et al. | 423/306 |
| 4,853,197 | 8/1989 | Wilson et al. | 423/306 |
| 5,780,003 | 7/1998 | Lewis | 423/305 |

OTHER PUBLICATIONS

Strobel, P. and Mouget, C., *Material Research Bulletin*, vol. 28, (1993) pp. 93–100.
Shen, Y.F. et.al., *Science*, vol. 260, (Apr. 23, 1993) pp. 511–515.
Weighardt, et al., *Chemical Commun.* (1988), p. 1145.
Sarneski, J., et al., *Inorganic Chemistry*, vol. 30 (1991), pp. 2833–2835.
Jaky, M., et al., *Polyhedron*, vol. 12, No. 11 (1993) pp. 1271–1275.
Lightfoot, P., et al., *Journal of Solid State Chemistry*, vol. 78, (1989), pp. 17–22.
Lightfoot, P., et al., *Journal of Solid State Chemistry*, vol. 73, (1988), pp. 325–329.

*Primary Examiner*—Wayne Langel
*Attorney, Agent, or Firm*—Thomas K. McBride; Frank S. Molinaro

[57] ABSTRACT

Hydrocarbon conversion processes using a new family of crystalline manganese phosphate compositions is disclosed. These compositions have an extended network; which network can be a one-, two-, or three-dimensional network. The composition has an empirical formula of:

$$(A^{a+})_v(Mn^{b+})(M^{c+})_xP_yO_z$$

where A is a templating agent such as an alkali metal, M is a metal such as Al, $Fe^{3+}$ and "b" is the average manganese oxidation state and varies from greater than 3.0 to about 4.0.

13 Claims, No Drawings

HYDROCARBON CONVERSION PROCESSES USING CRYSTALLINE MANGANESE PHOSPHATE COMPOSITIONS

CROSS REFERENCE TO RELATED APPLICATIONS

This application is a continuation-in-part of U.S. application Ser. No. 08/707,986 filed on Aug. 23, 1996 now U.S. Pat. No. 5,780,003.

FIELD OF THE INVENTION

This invention relates to hydrocarbon conversion processes using a new family of compositions containing at least manganese and phosphate components in an extended network. Examples of these hydrocarbon conversion processes are oxidative dehydrogenation of alkanes and oxidative coupling of methane to higher hydrocarbons. These compositions can have a one-, two- or three-dimensional network. Further, the average manganese oxidation state varies from greater than 3.0 to about 4.0.

BACKGROUND OF THE INVENTION

Manganese (IV) compounds are well known and are used in a variety of oxidation reactions. For example, manganese dioxide ($MnO_2$) has been used in the manufacture of chlorine gas from hydrogen chloride and the oxidation of aniline to hydroquinone. See "Chemistry of the Elements", N. N. Woodward and A. Earnnshaw, Pergammon Press, Oxford, pp 1219–20 (1984). A molecular manganese-oxo cluster is involved in the oxidation of water to oxygen in the photosynthesis process used by plants. See Yachandra et.al., Science, 260, 675–679 (1993). Because manganese has stable oxidation states of +4, +3 and +2, manganese oxides can be used in batteries.

Manganese oxides can have layered structures or three-dimensional microporous structures. S. Bark et al., Electrochimica Acta, 36, 1595–1603 (1991), P. LeGoff et al., Mat. Res. Bull., 31, 63–75 (1996), P. Strobel et al., Mat. Res. Bull., 28, 93–100 (1993), Y. Shen et al., Science, 260, 511–515 (1993). Finally, the ion-exchange properties of manganese oxide compositions have been reported by Q. Feng et al. in Chem. Mater., 7, 148–153 and 1722–1727 (1995).

In addition to manganese oxide compounds, there are reports of manganese phosphate molecular complexes containing Mn(IV). For example, Weighardt et al. have reported the synthesis of a trimeric manganese (IV) phosphate complex. Weighardt et al., Chem. Comm., 1145 (1988). A Mn(IV) dimer having the formula $[(bpy)(H_2PO_4)Mn^{+4}(\mu\text{-}O)_2(\mu\text{-}HPO_4)Mn^{+4}(bpy)]*H_2O$ where bpy=bipyridine has been reported by J. Sarneski et al., Inorg. Chem., 30, 2833–35 (1991). M. Jaky has disclosed dilute manganese (IV) phosphate solutions which were used for the oxidation of various organic substrates. Polyhedron, 12, 1271 (1993). Finally, there are a number of examples of Mn(III)-containing phosphates that have been prepared by hydrothermal synthesis, e.g., $KMn_2O(PO_4)(HPO_4)$, Lightfoot et. al., J. Solid State Chem., 73, 325–329, (1988), and $NH_4Mn_2O(PO_4)(HPO_4)$, Lightfoot et. al., J. Solid State Chem., 78, 17–22, (1989).

In contrast to these references, applicants have synthesized crystalline manganese phosphate compounds which contain Mn(IV) and which have an extended network. By extended network is meant that the defining Mn—P—O structural unit of the material repeats itself into at least two adjacent unit cells without termination of bonding, i.e., the material is not molecular. See "Structural Inorganic Chemistry, Fifth Edition," A. F. Wells, Clarendon Press, Oxford, pp. 11–15, (1984). The network can be one-dimensional (a linear chain), two-dimensional (layered) or three-dimensional. The three dimensional network may or may not be a microporous network. There is no mention of a manganese(IV)-containing phosphate material with an extended network. By Mn(IV)-containing phosphate, it is meant that the average oxidation state of Mn is greater than 3.0 but less than or equal to 4.0, indicating the presence of some Mn(IV). These compositions are prepared by employing large excesses of phosphate to avoid the precipitation of insoluble Mn(IV) oxides, and through careful control of the pH and the use of mild reaction conditions. Further, applicant has also synthesized metallo manganese phosphates where a portion of the manganese is replaced by a metal such as iron (III), aluminum, gallium, etc. This new family of compounds are useful in several hydrocarbon conversion processes such as oxidative dehydrogenation of alkanes and oxidative coupling of methane to higher hydrocarbons.

SUMMARY OF THE INVENTION

Applicants' invention relates to hydrocarbon conversion processes using a crystalline Mn(IV) phosphate composition having an extended network. Accordingly, one embodiment of the invention is a hydrocarbon conversion process comprising contacting a hydrocarbon feed under hydrocarbon conversion conditions with a crystalline manganese phosphate composition to give a converted product, the crystalline manganese phosphate composition having an extended network and an empirical composition on an anhydrous basis expressed by an empirical formula of:

$$(A^{a+})_v(Mn^{b+})(M^{c+})_xP_yO_z$$

where A is a templating agent selected from the group consisting of alkali metals, alkaline earth metals, hydronium ion, ammonium ion, organoammonium ions, silver, copper (II), zinc (II), nickel (II), mercury (II), cadmium (II) and mixtures thereof, "a" represents a weighted average valence of A and varies from 1.0 to 2.0, "v" is the mole ratio of A to Mn and varies from about 0.1 to about 5.0, "b" is the average valence of Mn and has a value of greater than 3 to about 4, M is a metal selected from the group consisting of Al, $Fe^{3+}$, Ga, $Sn^{4+}$, Ti, $Sb^{5+}$, Ag, Zn, Cu, Ni, Cd, and mixtures thereof, "x" is the mole ratio of M to Mn and varies from 0 to about 3.0, "c" is the weighted average valence of M and varies from about 1.0 to about 5.0, "y" is the mole ratio of P to Mn and varies from about 0.10 to about 5.0 and "z" is the mole ratio of O to Mn and has a value determined by the equation $$z=\tfrac{1}{2}(a\times v+b+x\times c+5\times y)$$

This and other objects and embodiments of the invention will become more apparent after a more detailed description of the invention.

DETAILED DESCRIPTION OF THE INVENTION

As stated, the instant invention relates to hydrocarbon conversion processes using a crystalline manganese phosphate composition. Accordingly, one essential element of the invention is a crystalline manganese phosphate composition. These compositions have an empirical chemical composition on an anhydrous basis expressed by the formula:

$$(A^{a+})_v(Mn^{b+})(M^{c+})_xP_yO_z$$

where A is a templating agent selected from the group consisting of alkali metals, alkaline earth metals, hydronium ion, ammonium ion, organoammonium ions, silver, copper (II), zinc (II), nickel (II), mercury (II), cadmium (II), and mixtures thereof, "a" represents a weighted average valence of A and varies from 1.0 to 2.0, "v" is the mole ratio of A to Mn and varies from about 0.1 to about 10, "b" is the average valence of Mn and has a value of greater than +3 to about 4, M is a metal selected from the group consisting of Al, $Fe^{3+}$, Ga, $Sn^{4+}$, Ti, $Sb^{5+}$, Ag, Zn, Cu, Ni, Cd, and mixtures thereof, "x" is the mole ratio of M to Mn and varies from 0. to about 3.0, "c" is the weighted average valence of M and varies from about 1.0 to about 5.0, "y" is the mole ratio of P to Mn and varies from about 0.10 to about 5.0 and "z" is the mole ratio of O to Mn and has a value determined by the equation $$z = \tfrac{1}{2}(a \times v + b + x \times c + 5 \times y)$$

The alkali metals include lithium, sodium, potassium, rubidium and cesium, while the alkaline earth metals include magnesium, calcium, strontium and barium. Illustrative examples of organoammonium ions include but are not limited to methylaminium, ethylenediaminium, and hexylaminium.

When A is one templating agent, the weighted average valence is the valence of the one templating agent. However, when more than one templating agent is used, the total amount of $$A_v^{a+} = A_i^{ai+} + A_j^{aj+} + A_k^{ak+} + \ldots$$

and the weighted average valance "a" is defined by $$a = \frac{a_i \cdot i + a_j \cdot j + a_k \cdot k + \ldots}{i + j + k}$$

The weighted average valence of manganese ("b") is dependent on the amount of $Mn^{3+}$ and $Mn^{4+}$ present in the composition. Thus, if the total amount of manganese "w" is defined by w=p+q, where "p" is the mole fraction of $Mn^{3+}$, "q" is the mole fraction of $Mn^{4+}$ then the average valence $$b = \frac{3p + 4q}{p + q}$$

Similarly, when two or more metals (M) are present, the amount of each metal is defined by $$M_x^{c+} = M_\alpha^{c\alpha^+} + M_\beta^{c\beta^+} + M_\gamma^{c\gamma^+} + \ldots$$

and the average valence C is determined by the equation $$C = \frac{C_\alpha \cdot \alpha + C_\beta \cdot \beta + C_\gamma \cdot \gamma}{\alpha + \beta + \gamma}$$

The crystalline compositions of the invention are characterized in that they have an extended network. By extended network is meant that the defining Mn—P—O structural unit of the material repeats itself into at least two adjacent unit cells without termination of bonding, i.e., the material is not molecular. See "Structural Inorganic Chemistry, Fifth Edition," A. F. Wells, Clarendon Press, Oxford, pp. 11–15, (1984). The compositions can have a one-dimensional network which is a linear chain, a two-dimensional network which is a layered network or a three-dimensional network which is either a microporous framework structure or a non-microporous framework structure.

The instant manganese phosphate compositions are prepared by hydrothermal crystallization of a reaction mixture prepared by combining reactive sources of phosphorus, manganese, optionally one M metal, at least one templating agent plus water. Specific examples of the phosphorus sources which can be used in this invention are orthophosphoric acid, pyrophosphoric acid, alkali phosphates and sodium metaphosphate. The manganese source can be either a high oxidation state salt such as $KMnO_4$, $NaMnO_4$, $CsMnO_4$, $NH_4MnO_4$, $Mg(MnO_4)_2$ and $Ba(MnO_4)_2$. Alternatively, the manganese source can be a combination of a high oxidation state manganese salt and a low oxidation state salt which acts as a reductant. The high oxidation state salts can be any of those enumerated above, while the low oxidation state salts include but are not limited to $Mn(NO_3)_2 \cdot 6H_2O$, $MnSO_4 \cdot H_2O$. Manganese oxides such as $Na_4Mn_{14}O_{27} \cdot 9H_2O$ can also be used. Finally, a special 1 wt. % manganese solution prepared from $NaMnO_4$ and $H_3PO_4$ which is described in detail in example 1 can also be used. The source of the alkali or alkaline earth metals include the halide, acetate, nitrate, carbonate, and hydroxide salts. Specific examples include sodium chloride, sodium nitrate, sodium acetate, sodium carbonate, sodium hydroxide, lithium chloride, lithium nitrate, lithium carbonate, lithium hydroxide, rubidium chloride, rubidium nitrate, rubidium carbonate, rubidium hydroxide, cesium chloride, cesium nitrate, cesium carbonate, cesium hydroxide, potassium chloride, potassium nitrate, potassium carbonate, potassium hydroxide, magnesium chloride, magnesium nitrate, magnesium carbonate, magnesium hydroxide, calcium chloride, calcium nitrate, calcium hydroxide, calcium carbonate, barium chloride, barium nitrate, barium carbonate, barium hydroxide, strontium chloride, strontium nitrate, strontium carbonate and strontium hydroxide. Sources of organoammonium ions include methylamine, hexylamine, propylamine, and ethylenediamine. The organoammonium cation is generated in situ. Finally, sources of the M metal include the nitrate salts of the metals as well as $TiCl_3$, $NaSbF_6$, and $SnCl_4$.

Generally, the hydrothermal process used to prepare the manganese phosphate of this invention involves forming a reaction mixture which has the formula:

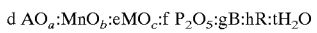

where B is a mineralizer, R is a reductant, "d" ranges from about 2.5 to about 20, "e" ranges from 0 to about 3.0, "f" ranges from about 2.0 to about 30, "g" ranges from 0 to about 2, "h" ranges from 0 to about 3, and "t" ranges from about 25 to about 1000. Examples of the mineralizer B included HF and NaF, while examples of the reductant R include $NaHCO_2$, $H_2C_2O_4$, and $NaC_2O_4$.

It also is necessary to adjust the pH of the mixture to a value of about 2.0 to about 9.0. The pH of the mixture can be controlled by addition of a base such as NaOH, $NH_4OH$, amines, etc.

Having formed the reaction mixture, it is next reacted at a temperature of about 50° C. to about 125° C. for a period of about 12 hours to about 96 hours. The reaction is carried out under atmospheric pressure or the reaction vessel may be sealed and the reaction run at autogenous pressure. In a preferred method the phosphorus source is orthophosphoric acid, the manganese source is $NaMnO_4 \cdot H_2O$, the temperature is from about 70° C. to about 100° C. and the time required to crystallize the product is from about 16 hours to about 36 hours.

It should be pointed out that not all the enumerated templating agents can provide all the various structures possible in the generic class of extended network manganese phosphate compositions. The relationship of specific templating agent to individual products is apparent from the illustrative examples set forth herein.

The crystalline manganese phosphate compositions of this invention can be used in various processes in which hydrocarbons are one of the reactants. Examples of these processes include conversion of hydrocarbons to alcohols, ethers, aldehydes, ketones or acid anhydrides; conversion of alcohols to aldehydes, ketones or carboxylic acids, conversion of mercaptans to sulfoxides, sulfones or sulfates; conversion of amines to amides; the oxidation of cyanides; oxidative dehydrogenation of alkanes; ammoxidation and oxidative coupling of methane to higher hydrocarbons. The conditions for these processes are known and generally involve contacting a hydrocarbon with the crystalline manganese phosphate compositions of this invention under hydrocarbon conversion conditions to give a converted product. The oxidation of cyanides is also well documented. The compositions of this invention can also be used as battery electrodes. These compositions can be used as ion exchangers and can purify various waste streams. Finally, those compositions having a three-dimensional network can be used to separate mixtures of molecular species by selective adsorption. Again such processes are well known in the art.

For completeness, conditions for the various processes enumerated above are presented here. Oxidative dehydrogenation (or oxydehydrogenation) can be carried out on alkanes, e.g., propane to propylene or alkyl aromatic compounds to alkenyl aromatic compounds. The process generally involves contacting the hydrocarbon with the composition of this invention at oxydehydrogenation conditions. Oxydehydrogenation conditions for alkanes include a temperature of about 350° C. to about 600° C., an hourly space velocity (HSV) of about 200 to about 20,000 $hr^{-1}$, a pressure of about atmospheric to about 1034 kPa (150 psi) and an oxygen to hydrocarbon mole ratio of about 0.5:1 to about 5:1. The oxydehydrogenation of alkylaromatic compounds is disclosed in U.S. Pat. No. 4,180,690 which is incorporated by reference. Conditions for the oxydehydrogenation of alkylaromatic compounds include a temperature of about 470° C. to about 600° C., an HSV of about 0.5 to about 10 $hr^{-1}$, a pressure of atmospheric and an oxygen to hydrocarbon mole ratio of about 0.5:1 to about 2:1.

Another process is ammoxidation of hydrocarbon and in particular ammoxidation of propane or propylene to acrylonitrile. Conditions for ammoxidation may be found in the art and specifically in U.S. Pat. Nos. 4,788,173; 5,171,876 and 5,049,692 all of which are incorporated by reference. General conditions include a temperature of about 350° C. to about 700° C., an HSV of about 100 to about 10,000 $hr^{-1}$, an ammonia to alkane mole ratio of about 0.5:1 to about 3:1, an oxygen to ammonia mole ratio of about 0.5:1 to about 10:1 and a pressure of atmospheric to about 1034 kPa (150 psi).

The oxidation of alcohols to ketones can be carried out at temperatures of about 150° C. to about 350° C., an HSV of about 200 $hr^{-1}$ to about 20,000 $hr^{-1}$, a pressure of atmospheric to about 1034 kPa (150 psi) and an oxygen to alcohol mole ratio of about 0.5:1 to about 5:1.

Methane coupling processes are typically carried out at temperatures of about 650° C. to about 900° C. The process can be carried in a cyclic mode where only methane is flowed over the catalyst at a Gas Hourly Space Velocity (GHSV) of about 500 to about 1500 $hr^{-1}$. In this mode the oxidation capability which is required is provided by the catalyst. Finally, the oxidation capacity of the catalyst is regenerated via a separate treatment with air, oxygen or air enriched with oxygen.

Another way of carrying out the process is where oxygen (or air) are co-fed to the catalyst. An inert carrier gas may also be used. The methane/$O_2$ mole ratio varies from about 2:1 to about 5:1. Finally, feed rates are such as to give a GHSV of about 1000 to about 10,000 $hr^{-1}$.

The conversion of hydrocarbons, e.g., alkanes, alkenes, to oxygen containing products such as anhydrides involve conditions of a temperature of about 200° C. to about 550° C., a feed in which the $O_2$/hydrocarbon mole ratio is from about 1:1 to about 10:1 and a GHSV of about 200 $hr^{-1}$ to about 10,000 $hr^{-1}$. Specific examples of this process include the conversion of butane to maleic anhydride and pentane to phthalic anhydride.

The oxidation state of manganese in the manganese phosphates described here is one of the characterizing properties of these new materials. The measurement of the oxidation state of manganese was carried out according to a variation of the oxalate method given in Piper et. al., *Geochimica et Cosmochimica Acta*, 48, 1237–1247, (1984). The Mn-containing sample is reduced to $Mn^{2+}$ when it is digested at 85° C. in a dilute sulfuric acid solution containing a known excess of sodium oxalate, the reducing agent. The solution is divided into two portions, one of which is analyzed for total Mn. In the second portion, the excess oxalate not consumed by the reduction of the sample is back-titrated with standardized $KMnO_4$, allowing the determination of the amount of oxalate consumed by the sample. The average oxidation state of manganese is then determined from the amount of oxalate consumed and the concentration of Mn in the sample.

In the examples which follow elemental analyses were conducted on air dried samples. Analysis was carried out for all elements except oxygen. Organic ammonium salts were determined by high temperature oxidative pyrolysis, yielding C, H, and N analyses. Because of the oxidizing nature of the reaction mixture used to prepare the compositions of this invention, all the metals (other than Mn) were assumed to be in their highest oxidation state, e.g., $Fe^{3+}$ or $Ti^{4+}$. Therefore, the oxygen stoichiometry was determined from the known oxygen requirements of all of the elements including the measured oxidation state of the manganese.

The structure of the manganese phosphates of this invention was determined by x-ray analysis. The x-ray patterns were obtained using standard x-ray powder diffraction techniques. The radiation source is a high-intensity, copper target, x-ray tube operated at 50 Kv and 40 ma. The diffraction pattern from the copper K-alpha radiation and graphite monochromator is suitably recorded by an x-ray spectrometer scintillation counter, pulse height analyzer and strip chart recorder. Flat compressed powder samples are scanned at 2θ (2 theta) per minute, using a two second time constant. Interplanar spacings (d) in Angstrom units are obtained from the position of the diffraction peaks expressed as 2θ where θ is the Bragg angle as observed on the strip chart. Intensities are determined from the heights of diffraction peaks after subtracting background, "$I_o$" being the intensity of the strongest line or peak, and "I" being the intensity of each of the other peaks.

Alternatively, the x-ray patterns are obtained from the copper K-alpha radiation by use of computer based techniques using a Siemens D-500 x-ray powder diffractometer, Siemens Type K-805 x-ray sources, available from Siemens Corporation, Cherry Hill, N.J., with appropriate computer interface.

As will be understood by those skilled in the art the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, and w which represent very strong, strong, medium, and weak, respectively. In terms of 100× $I/I_o$, the above designations are defined as $w$=0–15; $m$=15–60; $s$=60–80 and $vs$=80–100.

In certain instances the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present.

To allow for ready reference, the different structure types in the following examples have been given arbitrary numbers such as NaMnP-1. Thus NaMnP-1 and KNaMnP-1 have the same structure, i.e., structure type 1. One particular structure is the pharmacosiderite structure which has been designated—P. Additionally, variations have been observed in compositions having the same structure types. These have been designated by a letter after the number, e.g., NaMnP-2a and NaMnP-2b.

In order to more fully illustrate the variety of species to be derived from the instant invention, the following examples are set forth. It is to be understood that the examples are only by way of illustration and are not intended as an undue limitation on the broad scope of the invention as set forth in the appended claims.

EXAMPLE 1

The preparation of the series of manganese phosphates described below was carried out using a stock solution containing 1 wt. % manganese (0.2M) which can be stored for months without appreciable decomposition. This solution is referred to herein as the "1% Solution". The high concentration and stability of the 1% solution makes it a preferred material for preparing the manganese phosphate compositions of this invention.

In a 12 liter round bottom flask equipped with a mechanical stirrer and a dropping funnel there was added 5800 g of distilled water followed by 1802 g of concentrated (85.7 wt. %) $H_3PO_4$ and 250 g of $NaMnO_4 \cdot H_2O$ to give a dark purple solution. In a separate container 159.44 g of $NaHCO_2$ was dissolved in 576 g distilled water. This solution was placed in a dropping funnel and added dropwise to the stirring $NaMnO_4/H_3PO_4$ solution. The resultant mixture became a black-brown color over the course of the addition. Upon completion of the addition, the mixture was stirred for three to five days and then filtered on a buchner funnel. The filtered solution was analyzed and found to contain 1.0±0.1 wt. % Mn and the manganese had an average oxidation state of 3.85. This solution was identified as "1% Solution".

EXAMPLES 2–10

A series of compositions were prepared using the "1% Solution" and the general procedure set forth below. Specific amounts of reagents and specific conditions are presented in Table 1.

GENERAL PREPARATION PROCEDURE

1) In a container there was placed the desired amount of "1% Solution" and to it was added dropwise an aqueous base solution to adjust the pH and the resultant mixture was stirred for 15 minutes to 1 hour.
2) To the mixture there was now added the appropriate amount of templating agent either as a solid or aqueous solution and the mixture stirred for 45 minutes to 2 hours;
3) The resulting mixture of step (2) was placed in a Teflon® bottle or Teflon®-lined autoclave and digested for a particular amount of time at a temperature of about 25° C. to about 150° C. at autogenous pressure.
4) The resultant solid product was recovered by filtration and washed with distilled water. The product was dried at room temperature before being submitted for various analyses.

TABLE 1

Synthesis Variables for Examples 2–10 which employ the 1% solution

| Ex. | Name | 1% Solution (g) | Base (g)/$H_2O$ (g) | Template (g) | Digestion (hr/° C.) |
|---|---|---|---|---|---|
| 2 | NaMnP-1a | 1000 g | NaOH (65.5 g)/$H_2O$ (154.47 g) | same as base | 20 hr/98° C. (Stirred in a glass vessel) |
| 3 | NaMnP-1b | 750 g | NaOH (72.61 g)/$H_2O$ (290.43 g) | same as base | 21 hr/100° C. |
| 4 | NaKMnP-2a | 200 g | NaOH (11.93 g)/$H_2O$ (47.88 g) | 1) Propylamine (4.30 g) 2) $KNO_3$ (3.69 g) | 80 hr/70° C. |
| 5 | MeNH$_3$MnP-2b | 200 g | NaOH (13.28 g)/$H_2O$ (39.83 g) | Methylamine (40% solution) (7.06 g) | 75 hr/70° C. |
| 6 | C$_6$NH$_3$MnP-3 | 271.3 g | NaOH (19.72 g)/$H_2O$ (10.0 g) | Hexylamine (10.0 g) | 95 hr/25° C. (in a shaker bath) |
| 7 | KMnP-P | 500 g | KOH (46.47 g)/$H_2O$ (139.41 g) | $KNO_3$ (7.43 g) | 16 hr/100° C. |
| 8 | NH$_4$MnP-P | 500 g | $NH_4OH$ (29.3% $NH_3$, 46.37 g) | $NH_4NO_3$ (5.82 g) | 16 hr/100° C. |
| 9 | RbMnP-P | 748 g | NaOH (50.0 g)/$H_2O$ (50.0 g) | $RbNO_3$ (30.32 g) | 23 hr/100° C. |
| 10 | CsMnP-P | 500 g | NaOH (28.64 g)/$H_2O$ (28.61 g) | $CsNO_3$ (35.48 g) | 24 hr/100° C. |

EXAMPLES 11–14

These examples present the synthesis of compositions containing M metals. The procedure used is the same as in Examples 2–10 except that the desired M metal is introduced by mixing an aqueous solution containing the desired M metal with the "1% Solution". Each of Examples 11–14 used 500 g of the "1% Solution".

The resultant mixture was heated to 50° C. and held there for 3 hours with stirring. Next, the pH of the mixture was adjusted by dropwise adding a solution composed of 66.0 g of an 85% KOH solution and 66.0 g of distilled water. This reaction mixture was now stirred for one hour, transferred to a Teflon®-lined autoclave and digested at 100° C. for 62 hours at autogenous pressure. Finally, the red-brown addition of 142.3 g of $KNO_3$. The reaction mixture was homog-

TABLE 2

Synthesis Variables for Examples 12–15

| EX. | Name | M Solution (g)//Aging (hr) | Base (g)/$H_2O$ (g) | Template (g) | Digestion hr/° C. |
|---|---|---|---|---|---|
| 12 | KAlMnP-P | $Al(NO_3)_3*9H_2O$ (11.38 g)/$H_2O$ (50.0 g)//14 hr | NaOH (30.56 g)/$H_2O$ (60.79 g) | $KNO_3$ (27.61 g) | 23 hr/100° C. |
| 13 | CsAlMnP-P | $Al(NO_3)_3*9H_2O$ (11.38 g)/$H_2O$ (50.0 g)//15 hr | NaOH (29.69 g)/$H_2O$ (59.71 g) | $CsNO_3$ (53.22 g) | 22 hr/100° C. |
| 14 | KFeMnP-P | $Fe(NO_3)_3*9H_2O$ (12.26 g)/$H_2O$ (50.0 g)//13 hr | NaOH (31.92 g)/$H_2O$ (64.30 g) | $KNO_3$ (27.61 g) | 25 hr/100° C. |
| 15 | CsFeMnP-P | $Fe(NO_3)_3*9H_2O$ (12.26 g)/$H_2O$ (50.0 g)//13 hr | NaOH (32.02 g)/$H_2O$ (64.84 g) | $CsNO_3$ (53.22 g) | 24 hr/100° C. |

EXAMPLE 15

Preparation of CsMnP-P

In a glass beaker there were mixed 202.8 g of distilled water, 30.00 g of $CsMnO_4$ and 136.23 g concentrated phosphoric acid (85.7 wt. % $H_3PO_4$). The resultant suspension was heated to 60° C. to dissolve the $CsMnO_4$. In a separate container a manganese sulfate solution was prepared by dissolving 30.82 g of $MnSO_4.H_2O$ in 55 g of distilled water. This solution was placed in a buret and slowly added to the warm $CsMnO_4/H_3PO_4$ solution. After addition of the $MnSO_4$ solution was complete, the mixture was stirred and aged for one hour at which point 357.1 g of an aqueous solution containing 50% CsOH was added dropwise. At this point, the mixture was removed from the heat source, stirred with a high speed stirrer, transferred to a Teflon-lined autoclave an digested at 100° C. for 62 hours at autogenous pressure. The dark brown solid was filtered, washed with distilled water and dried at room temperature.

EXAMPLE 16

Preparation of KFeMnP-P

In a beaker there were mixed 156.3 g of distilled water, 194.54 g concentrated phosphoric acid (85.7% $H_3PO_4$) and 40.00 g $KMnO_4$. In a separate container 34.08 g of $Fe(NO_3)_3.9H_2O$ was dissolved in 124 g of distilled water and the solution was slowly added to the $KMnO_4/H_3PO_4$ mixture. Next, a solution of 31.94 $KHCO_2$ in 114.7 g distilled water was prepared and added dropwise to the reaction mixture. enized with a high speed stirrer for 1 hour, placed in a Teflon®-lined autoclave and digested at 125° C. for 97 hours. A red-brown solid was filtered, washed with distilled water and dried at room temperature.

EXAMPLE 17

Preparation of KTiMnP-P

In a baffled flask there were added 648.8 g of concentrated phosphoric acid and 1060 g of distilled water. To this solution 75.00 g of $NaMnO_4.H_2O$ were added and the resultant mixture vigorously stirred. Next, 202.5 g of a 20% $TiCl_3$ solution was added dropwise. During this addition chlorine gas was released. After the addition of the $TiCl_3$ solution was complete, the temperature of the reaction mixture was raised to 70° C. and held there for three hours with stirring. Next, 396.8 g of a 50% NaOH solution was added to adjust the pH followed by the addition of 142.3 g of $KNO_3$. The reaction mixture was homogenized with a high speed stirrer for 1 hour, placed in a Teflon®-lined autoclave and digested at 125° C. for 97 hours. A red-brown solid was filtered, washed with distilled water and dried at room temperature.

CHARACTERIZATION OF COMPOSITIONS

Samples from each example above were analyzed by x-ray diffraction analysis. The d(Å) spacings and relative intensities are presented in Table 3. As stated, the compounds designated with a -P have the pharmacosiderite structure while compounds identified with -1a, -1b have similar but not identical structures. Elemental analyses were conducted as set forth above and empirical formulas are presented in Table 4.

TABLE 3

Spacing for Examples 2–18 d (Å)

| Example 2 NaMnP-1a | | Example 3 NaMnP-1b | | Example 4 NaKMnP-2a | | Example 5 $MeNH_3MnP$-2b | | Example 6 $C_6H_{13}NH_3MnP$-3c | | Example 7 KMnP-P | | Example 8 $NH_4MnP$-P | | Example 9 RbMnP-P | | Example 10 CsMnP-P | | Example 11 KAlMnP-P | |
|---|---|---|---|---|---|---|---|---|---|---|---|---|---|---|---|---|---|---|---|
| d (Å) | I | d (Å) | I | d (Å) | I | d (Å) | I | d (Å) | I | d (Å) | I | d (Å) | I | d (Å) | I | d (Å) | I | d (Å) | I |
| 7.41 | vs | 7.73 | vs | 11.22 | vs | 11.08 | vs | 23.56 | vs | 7.55 | vs | 7.62 | vs | 7.64 | vs | 7.55 | m | 7.51 | vs |
| 3.68 | s | 3.78 | m | 5.62 | m | 5.60 | m | | | 5.31 | w | 5.38 | w | 4.39 | m | 4.37 | m | 5.31 | w |
| 2.44 | vs | 2.43 | m | 3.23 | m | 3.70 | m | | | 4.34 | m | 4.39 | m | 3.80 | vs | 3.79 | vs | 4.33 | m |
| 1.39 | m | 1.42 | m | 2.79 | vs | 3.24 | w | | | 3.76 | m | 3.80 | w | 3.40 | w | 3.39 | w | 3.75 | m |

TABLE 3-continued

Spacing for Examples 2–18 d (Å)

| 2.68 | m | 2.80 | m |  |  | 3.07 | m | 3.10 | m | 3.10 | m | 3.10 | m | 3.06 | m |
| 2.12 | w | 2.74 | w |  |  | 2.66 | m | 2.69 | w | 2.69 | s | 2.69 | s | 2.65 | m |
| 1.62 | m | 2.68 | w |  |  | 2.51 | m | 2.53 | w | 2.53 | m | 2.53 | m | 2.50 | w |
|  |  | 2.21 | w |  |  | 2.38 | m | 2.40 | w | 2.40 | m | 2.40 | m | 2.37 | m |
|  |  | 1.62 | w |  |  | 2.27 | w | 2.29 | w | 2.29 | w | 2.29 | m | 2.26 | w |
|  |  |  |  |  |  | 2.01 | w | 2.03 | w | 2.19 | m | 2.19 | m | 2.16 | w |
|  |  |  |  |  |  | 1.89 | w | 1.90 | w | 2.03 | m | 2.03 | m | 2.00 | w |
|  |  |  |  |  |  | 1.83 | w | 1.84 | w | 1.84 | m | 1.84 | m | 1.87 | w |
|  |  |  |  |  |  | 1.79 | w | 1.79 | w | 1.79 | m | 1.79 | m | 1.82 | w |

| Example 12 CsAlMnP-P | | Example 13 KFeMnP-P | | Example 14 CsFeMnP-P | | Example 15 CsMnP-P | | Example 16 KFeMnP-P | | Example 17 KMnTiP-P | |
|---|---|---|---|---|---|---|---|---|---|---|---|
| d (Å) | I | d (Å) | I | d (Å) | I | d (Å) | I | d (Å) | I | d (Å) | I |
| 7.60 | m | 7.57 | vs | 7.67 | m | 7.66 | w | 7.56 | vs | 7.61 | vs |
| 4.38 | m | 5.35 | w | 4.2 | m | 4.42 | m | 5.38 | w | 5.37 | w |
| 3.79 | vs | 4.37 | w | 3.83 | vs | 3.82 | vs | 4.36 | w | 4.38 | m |
| 3.39 | w | 3.79 | m | 3.42 | w | 3.44 | w | 3.78 | m | 3.79 | m |
| 3.09 | m | 3.09 | m | 3.13 | m | 3.12 | m | 3.09 | m | 3.09 | m |
| 2.68 | s | 2.68 | w | 2.71 | s | 2.70 | m | 2.67 | m | 2.68 | m |
| 2.53 | m | 2.40 | m | 2.55 | m | 2.55 | w | 2.52 | m | 2.53 | m |
| 2.40 | m | 2.29 | w | 2.42 | m | 2.42 | w | 2.40 | m | 2.40 | m |
| 2.28 | m | 2.19 | w | 2.31 | m | 2.31 | w | 2.28 | w | 2.28 | w |
| 2.19 | m | 2.03 | w | 2.21 | m | 2.21 | w | 2.19 | w | 2.19 | w |
| 2.03 | w | 1.90 | w | 2.04 | w | 2.04 | w | 2.02 | w | 2.02 | w |
| 1.84 | w | 1.84 | w | 1.86 | w | 1.85 | w | 1.84 | w | 1.84 | w |
| 1.79 | w | 1.79 | w | 1.80 | w | 1.80 | w | 1.79 | w | 1.79 | w |

TABLE 4

Empirical Formulas and Mn Oxidation State

| Example | Mn Oxidation State | Empirical Formula |
|---|---|---|
| Example 2, NaMnP-1a | 3.89 | $Na_{2.03}Mn_{6.00}P_{1.00}O_{15.18}$ |
| Example 3, NaMnP-1b | 3.90 | $Na_{3.27}Mn_{8.06}P_{1.00}O_{19.85}$ |
| Example 4, NaKMnP-2a | 3.32 | $Na_{3.87}K_{1.69}Mn_{6.0}P_{4.89}O_{24.97}$ |
| Example 5, MeNH$_3$MnP-2b | 3.11 | $Na_{4.40}(CH_3NH_3)_{1.14}Mn_{6.0}P_{5.18}O_{25.05}$ |
| Example 6, C$_6$NH$_3$MnP-3 | 3.15 | $Na_{4.51}(C_6H_{13}NH_3)_{4.54}Mn_{9.00}P_{8.01}O_{38.73}$ |
| Example 7, KMnP-P | 3.67 | $Na_{0.07}K_{2.37}Mn_{4.0}P_{2.63}O_{15.14}$ |
| Example 8, NH$_4$MnP-P | 3.51 | $Na_{0.05}(NH_4)_{1.54}Mn_{4.0}P_{3.19}O_{15.79}$ |
| Example 9, RbMnP-P | 3.80 | $Na_{0.31}Rb_{2.44}Mn_{4.0}P_{2.65}O_{15.6}$ |
| Example 10, CsMnP-P | 3.67 | No Analysis, See Example 15 |
| Example 11, KAlMnP-P | 3.75 | $Na_{0.14}K_{2.45}Al_{1.0}Mn_{3.0}P_{3.31}O_{16.70}$ |
| Example 12, CsAlMnP-P | 3.77 | $Na_{0.05}Cs_{2.62}Al_{0.96}Mn_{3.04}P_{3.22}O_{16.78}$ |
| Example 13, KFeMnP-P | 3.88 | $Na_{0.29}K_{2.17}Fe_{0.96}Mn_{3.04}P_{3.14}O_{16.41}$ |
| Example 14, CsFeMnP-P | 3.71 | $Na_{0.05}Cs_{2.73}Fe_{0.98}Mn_{3.02}P_{3.13}O_{16.29}$ |
| Example 15, CsMnP-P | 3.65 | $Cs_{2.38}Mn_{4.00}P_{3.26}O_{16.64}$ |
| Example 16, KFeMnP-P | 3.84 | $K_{2.97}Fe_{1.00}Mn_{3.00}P_{3.56}O_{17.65}$ |
| Example 17, KTiMnP-P | 4.70* | $Na_{0.50}K_{2.94}Ti_{1.52}Mn_{2.48}P_{3.90}O_x$ |

*Ti seems to interfere with oxidation state measurement giving a high result.

Examples 11–14 and 16–17 demonstrate placing M metals into the network of the manganese phosphates, in these particular cases, into the manganese phosphate pharmacosiderite structure. The effect of successful metal substitutions can be seen in the properties of the substituted materials. When heated to a sufficiently high temperature, the manganese phosphate pharmacosiderites undergo an autoreduction via oxygen loss, the characteristic temperature of which is determined by thermogravimetric analysis. The data in Table 5 show that substitution of Mn by Al, Fe, or Ti stabilize the structure to this oxygen loss, shifting the oxygen loss process to higher temperatures.

TABLE 5

Oxygen Loss Temperatures determined by Thermogravimetric Analysis

| 1.0. | Temperature of $O_2$ Loss |
|---|---|
| KMnP-P | 535° C. |
| KAlMnP-P | 560° C. |
| KFeMnP-P | 550° C. |
| KTiMnP-P | 585° C. |

EXAMPLE 18

Ion Exchange Determination

In a typical experiment, 5–7.5 g of the material to be exchanged was placed in 500 ml of a metal nitrate solution which is 0.25 M with respect to the exchanging cation. The solid was stirred in the exchange solution for 24 hours at 60° C. The products were isolated by filtration and washed thoroughly with distilled water. The solids were characterized by x-ray diffraction and elemental analysis was used to determine the extent of the ion-exchange. The results are reported in terms of the percentage of the exchange sites occupied by the incoming cations.

TABLE 6

Ion-exchange results for KMnP-P and NaMnPa-1

| Exchange Cation | % Exchange KMnP-P | % Exchange NaMnPa-1 |
|---|---|---|
| $Cs^+$ | 91% exchanged | 94.2% exchanged |
| $NH_4^+$ | 75% exchanged | 97.5% exchanged |
| $K^+$ | | 95.0% exchanged |
| $Sr^{2+}$ | 55% exchanged | |

EXAMPLE 19

Adsorption measurements were performed using a standard McBain-Bakr gravimetric adsorption apparatus on the following samples. The samples were activated at 200/C overnight under vacuum to remove adsorbed water from the pores. The samples were then exposed to the various partial pressures of the gases as indicated in tables 7–9. The adsorption of the gases is expressed in terms of the weight percent of the sample. The molecular sieve effect is demonstrated for both the $K^+$ and $Cs^+$ forms of materials of the same framework composition. The $Cs^+$ forms are about 1.5 times heavier on a molar basis than the $K^+$ forms. The $K^+$ and $Cs^+$ are located in the pores of the pharmacosiderite structure and can affect adsorption properties of the different molecules in the pores. It is shown that the larger $Cs^+$ interferes more with the adsorption of the molecules than K. The ionic radii of $K^+$ and $Cs^+$ are 1.35 Å and 1.67 Å respectively. The kinetic diameters of water, carbon dioxide, and oxygen are 2.65 Å, 3.3 Å, and 3.46 Å respectively.

TABLE 7

Adsorption of Water

| $P/P_0$ (partial pressure) | KFeMnP-P wt. % water | KAlMnP-P wt. % water | CsFeMnP-P wt. % water | CsAlMnP-P wt. % water |
|---|---|---|---|---|
| 0.19 | 9.28% | 8.90% | 2.69% | 3.66% |
| 0.42 | 10.56% | 9.36% | 2.89% | 3.84% |
| 0.74 | 11.69% | 10.96% | 3.47% | 4.49% |

TABLE 8

Adsorption of Carbon Dioxide

| $P/P_0$ (partial pressure) | KFeMnP-P wt. % $CO_2$ | KAlMnP-P wt. % $CO_2$ | CsFeMnP-P wt. % $CO_2$ | CsAlMnP-P wt. % $CO_2$ |
|---|---|---|---|---|
| 0.13 | 7.47% | 4.68% | 1.10% | 1.74% |
| 0.52 | 8.37% | 5.48% | 1.30% | 2.11% |
| 0.92 | 8.75% | 6.05% | 1.50% | 2.11% |

TABLE 9

Adsorption of Oxygen

| $P/P_0$ (partial pressure) | KFeMnP-P wt. % $O_2$ | KAlMnP-P wt. % $O_2$ | CsFeMnP-P wt. % $O_2$ | CsAlMnP-P wt. % $O_2$ |
|---|---|---|---|---|
| 0.13 | 4.07% | 1.25% | 1.99% | 1.65% |
| 0.52 | 4.98% | 1.49% | 2.99% | 2.47% |
| 0.92 | 5.20% | 1.60% | 3.09% | 2.56% |

These results show the microporosity of these materials and that they have pore diameters of about 3.5 Å.

EXAMPLE 20

Samples from examples 6 (KMnP-P), 12(Cs-AlMnP-P) and 14 (Cs-FeMnP-P) were tested for hydrocarbon conversion activity via a propane pulse test. The samples were calcined in air at 500° C. for 3 hr and sized to 40 to 60 mesh before testing. Tests were performed using 0.1–0.5 g loadings of the manganese phosphates in a ¼" stainless steel tube. The sample was sandwiched between two small plugs of quartz wool. The catalysts were tested in the temperature range between 400° C. and 600° C., in 50° C. increments, with 3 propane pulses at each temperature. The propane pulse size was 25 µl at atmospheric pressure and was swept over the sample at a room temperature rate of 25 cc/min (approximate pulse residence time at 500° C. is 0.4 seconds). Area counts for the sample using a TCD were compared versus a pulse injection through a reactor by-pass. The entire pulse was sent to a GC equipped with ⅛"×3' Porapak Q column. The propane feed contained a small amount of butane and ethane. Results of the pulse testing (after the third pulse) are presented in Table 10. Normalized selectivities to the stated products are presented.

TABLE 10

Conversion of Propane Using Various MnP Compositions

| Sample | Temp | $C_3$ conv | Acrolein | $C_3H_6$ | $C_2H_6$ | $C_2H_4$ | $CH_4$ | CO | $CO_2$ |
|---|---|---|---|---|---|---|---|---|---|
| KMnP-P | 550° C. | 56.3% | 0.4% | 6.8% | 0.5% | 27.0% | 4.9% | 4.6% | 56.3% |
| KMnP-P | 600° C. | 39.1% | 0.1% | 19.1% | 0.6% | 37.0% | 9.3% | 1.4% | 32.6% |
| CsAlMnP-P | 550° C. | 40.9% | 0.1% | 11.6% | 1.3% | 31.4% | 6.0% | 3.6% | 46.1% |
| CsAlMnP-P | 600° C. | 24.1% | 0.1% | 21.0% | 2.1% | 37.4% | 18.9% | 4.0% | 16.7% |
| CsFeMnP-P | 550° C. | 31.3% | 1.6% | 47.8% | 0.5% | 30.0% | 4.9% | 4.7% | 12.1% |
| CsFeMnP-P | 600° C. | 7.24% | 0.0% | 35.5% | 1.2% | 40.1% | 18.5% | 1.1% | 3.7% |

The results in Table 10 show that the manganese phosphates of this invention convert propane to various hydrocarbons with varying selectivities. While the unsubstituted manganese phosphate makes a considerable amount of CO and $CO_2$, the addition of aluminum and iron yields more olefins. Ethylene and propylene are the major products followed by methane and then significantly less ethane. These compositions show good oxidative dehydrogenation activity.

I claim as my invention:

1. A hydrocarbon conversion process comprising contacting a hydrocarbon feed with a crystalline manganese phosphate composition under hydrocarbon conversion conditions to give a converted product, the manganese phosphate composition having an extended network and an empirical composition on an anhydrous basis expressed by an empirical formula of:

$$(A^{a+})_v(Mn^{b+})(M^{c+})_xP_yO_z$$

where A is a templating agent selected from the group consisting of alkali metals, alkaline earth metals, hydronium ion, ammonium ion, organoammonium ions, silver, copper (II), zinc (II), nickel (II), mercury (II), cadmium (II), and mixtures thereof, "a" represents a weighted average valence of A and varies from 1.0 to 2.0, "v" is the mole ratio of A to Mn and varies from about 0.1 to about 5, "b" is the average valence of Mn and has a value of greater than 3 to about 4, M is a metal selected from the group consisting of Al, $Fe^{3+}$, Ga, $Sn^{4+}$, Ti, $Sb^{5+}$, Ag, Zn, Cu, Ni, Cd, and mixtures thereof, "x" is the mole ratio of M to Mn and varies from 0 to about 3.0, "c" is the weighted average valence of M and varies from about 1.0 to about 5.0, "y" is the mole ratio of P to Mn and varies from about 0.10 to about 5.0 and "z" is the mole ratio of O to Mn and has a value determined by the equation $$z=\tfrac{1}{2}(a\text{ ``}v+b+x\text{''}c+5y).$$

2. The process of claim 1 where the hydrocarbon conversion process is oxidative dehydrogenation.

3. The process of claim 1 where the hydrocarbon conversion process is ammoxidation.

4. The process of claim 1 where the hydrocarbon conversion process is oxidative coupling of methane.

5. The process of claim 1 where the hydrocarbon conversion process is the oxidation of hydrocarbons to anhydrides.

6. The process of claim 1 where the hydrocarbon conversion process is the oxidation of alcohols to ketones.

7. The process of claim 1 where the composition is characterized in that it has a one-dimensional extended network.

8. The process of claim 1 where the composition is characterized in that it has a two-dimensional extended network.

9. The process of claim 1 where the composition is characterized in that it has a three-dimensional extended network.

10. The process of claim 9 where the three-dimensional extended network is a microporous network.

11. The process of claim 1 where A is an alkali metal.

12. The process of claim 11 where the alkali metal is selected from the group consisting of potassium, cesium and sodium.

13. The process of claim 1 where the M metal is selected from the group consisting of aluminum, iron and titanium.

* * * * *